United States Patent [19]
Bizzi et al.

[11] Patent Number: 5,554,033
[45] Date of Patent: Sep. 10, 1996

[54] SYSTEM FOR HUMAN TRAJECTORY LEARNING IN VIRTUAL ENVIRONMENTS

[75] Inventors: Emilio Bizzi, Belmont, Mass.; Ferinando A. Mussa-Ivaldi, Evanston, Ill.; Reza Shadmehr, Waltham, Mass.

[73] Assignee: Massachusetts Institute of Technology, Cambridge, Mass.

[21] Appl. No.: 270,028

[22] Filed: Jul. 1, 1994

[51] Int. Cl.$^6$ .............................. A63B 69/00; G09B 9/00; G09B 19/00

[52] U.S. Cl. ..................... 434/247; 454/307 R; 454/365; 273/26 R; 273/29 R; 463/23; 482/902

[58] Field of Search .................................. 434/248, 251, 434/252, 307 R, 308, 317, 247, 365, 252; 463/1, 23; 482/902; 395/152; 273/26 R, 29 R, DIG. 28; 364/410; 345/112, 113, 156; 348/61, 578

[56] References Cited

U.S. PATENT DOCUMENTS

| | | | |
|---|---|---|---|
| 3,408,750 | 11/1968 | McCollough et al. | 434/252 |
| 4,337,049 | 6/1982 | Connelly . | |
| 5,174,759 | 12/1992 | Preston et al. | 434/307 R X |
| 5,249,967 | 10/1993 | O'Leary et al. | 434/252 X |
| 5,342,051 | 8/1994 | Rankin et al. | 434/252 X |
| 5,414,256 | 5/1995 | Gurner et al. | 364/410 X |

FOREIGN PATENT DOCUMENTS

| | | |
|---|---|---|
| 92/21412 | 12/1992 | WIPO . |
| 93/00970 | 1/1993 | WIPO . |

OTHER PUBLICATIONS

D. G. Alciatore, et al., "Matrix Solution of Digitized Planar Human Body Dynamics for Biomechanics Laboratory Instruction," *Computers in Engineering*, 2:271–276 (1992).

E. Fauvet, et al., "Human Movement Analysis with Image Processing in Real Time", *SPIE— 19th International Congress on High-Speed Photography and Photonics*, 1358:620–630 (1990).

P. Morasso, et al., "Kinesis: A Model–Driven Approach to Human Motion Analysis", *SPIE—Close Range Photogrammetry Meets Machine Vision*, 1395:775–780 (1990).

G. A. Rong et al., "Human Body Motion Image Analysis System", *IEEE Engineering in Medicine & Biology Society 11th Annual International Conference*, 2770(6) (1989).

T. M. Kepple, et al., "The Presentation and Evaluation of a Video Based, Six Degree–of freedom Approach for Analyzing Human Motion", *IEEE Engineering in Medicine & Biology Society 10th Annual International Conference*, 2566(8) (1988).

T. P. Andriacchi, "Clinical Applications of the Selspot System", *AMD (Symposia Series) American Society of Mechanical Engineers, Applied Mechanics Division*, pp. 339–342 (1987).

A. Baca, "Application of Image Processing to Human Motion Analysis", *SPIE–The International Society for Optical Engineering*, 1135:153–156 (1989).

(List continued on next page.)

*Primary Examiner*—Joe Cheng
*Attorney, Agent, or Firm*—Hamilton, Brook, Smith & Reynolds, P.C.

[57] ABSTRACT

In an apparatus and method for teaching motor skills to a human subject, learning by a student is based upon imitation of a teacher's motion. The teacher's motion is sensed by a motion sensing device, is digitized by a computer, and is then recorded in non-volatile computer memory. The computer generates an image sequence of the teacher on the computer display for the student to view and imitate. The same motion sensing device used to record the teacher's movement records the student's movement and the computer creates an image sequence on the display corresponding to the student's movement, simultaneously providing an image sequence of the teacher's movement. The training of the student is based upon displaying the pre-stored teacher's motion on the screen. The student's task is to imitate the teacher's movement. This process is repeated until the teacher's and student's trajectories match well in space and time.

33 Claims, 9 Drawing Sheets

OTHER PUBLICATIONS

G. T. Rab, "Application of Three-Dimensional Videography to Human Motion Studies: Constraints, Assumptions, and Mathematics," *SPIE-The International Society for Optical Engineering*, 832:31–34 (1987).

J. Burnie, et al., "Microcomputing in Motion Analysis," *Journal of Microcomputer Applications*, 10(2):113–117 (1987).

K. J. DeLuzio, et al., "A Procedure to Validate Three–Dimensional Motion Assessment Systems", *J. Biomechanics*, 26(6):753–759 (1993).

J. D. Foley, "Interfaces for Advanced Computing", *Scientific American*, 257:126–135 (1987).

SYSTEM FOR HUMAN TRAJECTORY LEARNING IN VIRTUAL ENVIRONMENTS

GOVERNMENT FUNDING

This invention was made with Government support under Grant Number NIH-5R01-NS09343 awarded by the National Institutes of Health. The Government has certain rights in the invention.

BACKGROUND OF THE INVENTION

In current motion learning systems, a student acquires motor skills by viewing and imitating the motions of a teacher. The motion sequences of the student and teacher are typically recorded by video cameras and stored on video tape. Some systems digitize the video image and store the motion sequence in computer memory. The student views the video or computer animation and compares his motion to the motion of the teacher.

Systems such as SELSPOT and Optotrack are popular human motion analysis systems. A plurality of light emitting diode markers are fixed to anatomically-interesting locations on a subject. A computer activates the markers in a predetermined order as video cameras record the motion of the subject. Signal processing software compiles a motion sequence of the subject which is viewed on a monitor as an animated humanoid or as a stick figure.

Another popular system uses reflective markers (Elite) instead of light emitting diodes. A light source mounted on the video camera periodically illuminates the markers. Software processes the video image, creating a motion sequence of the subject.

In each of the above systems, a plurality of cameras are required for three dimensional motion analysis. Systems with more than one camera require complex synchronization hardware and more robust signal processing software. An additional drawback with these systems is that a marker must be visible simultaneously by two cameras to determine three dimensional positioning of the marker. As the subject moves, most markers are hidden in at least a few frames, reducing system accuracy.

SUMMARY OF THE INVENTION

The present invention presents an apparatus and a method for motion learning. The apparatus of the invention includes a motion-sensing device for sensing movement, electronics responsive to the motion-sensing device, computer memory and a display screen. The electronics generate an image sequence on the display corresponding to a student's movement. Simultaneously, an image sequence corresponding to a teacher's movement is provided on the display. In this way, the student may imitate and learn the teacher's movement.

The motion-sensing device is attached to an implement, for example, a racquet, and provides the computer with information on position and orientation of the implement. The electronics generate an image of the implement and up-date this image in real time as the student moves the implement.

The objective of the device is to help the student learn a motion pattern. The student's learning of new motions is implemented in the following three steps. First, the motion-sensing device is connected to the teacher's hand or racquet and the teacher's motion is stored in the computer's memory. Second, the student carries the motion-sensing device on his or her hand or racquet. Third, the image sequence corresponding to the student's movement is displayed on the screen and compared with the stored teacher's motion. The student's goal is to imitate the teacher's trajectory. The teacher's movement may be selected from a library of stored teacher's movements, according to the student's needs. The electronics may gradually increase the speed of the image sequence of the teacher's movement, up to real time, as the student becomes proficient at following the teacher's movement.

The motion-sensing device may be one which establishes an oriented electromagnetic field between fixed and moving units of the motion sensing device.

This novelty of the present invention is the close coupling between the motion of the teacher and that of the student. The student is provided with visual feedback in real time without having to rely on his memory and his visual interpretation of the teacher's motion. In addition, the present invention is reduced in size, complexity, and cost over prior motion analysis systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

The present invention generates an image of a teacher's motion in the same frame of reference as that of a student, providing a more effective method of learning than previous systems. The present invention provides an immediate and direct comparison in space and time of the teacher's and student's trajectories. The present invention requires no video cameras and therefore is continuously recording data regardless of the location of the sensor. Thus, the sensors need not be located in areas "visible" to the camera to record data, as in other systems.

Figure 1:
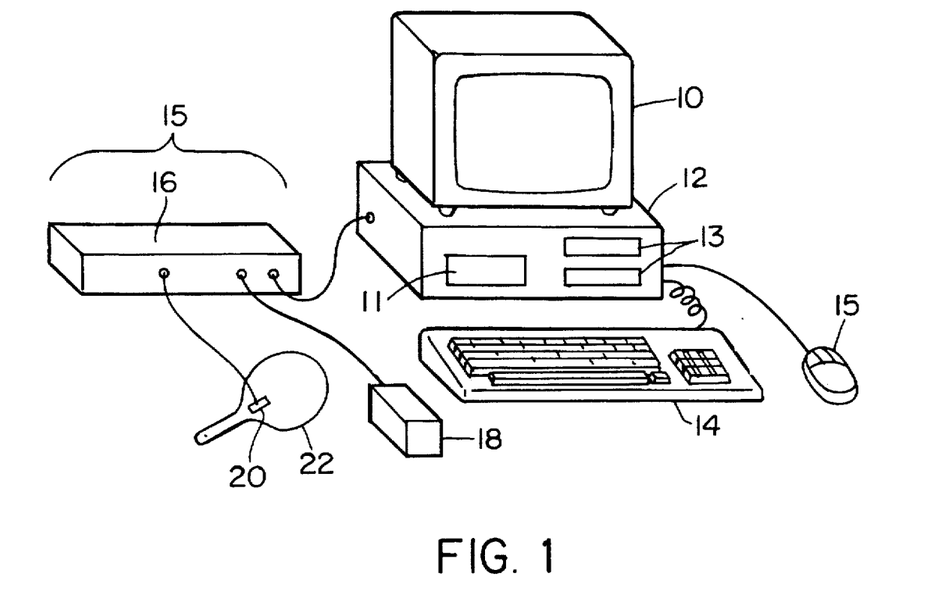
FIG. 1 illustrates the primary components of a motion teaching system in accordance with the present invention.

FIG. 1 illustrates the primary components of a motion learning system in accordance with the present invention. A programmable host computer 12 includes a keyboard 14, a mouse 15, a monitor 10, volatile memory 11, and permanent memory 13 including floppy drives, hard drives and CD-ROM. A motion sensing device 15 is in communication with the computer 12 and is preferably a commercially available Polhemus™ system which includes a motion processing unit 16, transmitter 18, and sensor 20. The sensor 20 is attached to the object in motion, for example, a ping-pong paddle 22.

Software operating on the computer 12 continually monitors the sensor 20 position and orientation data generated at the motion processing unit 16 and updates an image of the object 22 in motion on the monitor 10. The user controls the software with the keyboard 14 and mouse 15.

The first step for training is to acquire a motion sequence from a teacher who is preferably an expert at performing that particular motion. The sensor 20 is placed on an appropriate part of the teacher's limb or on the implement in motion for example, a racquet. If the teacher is a tennis professional, the sensor would be placed on the handle of the tennis racquet and/or his forearm. The transmitter 18 is placed within range of the teacher. The sensor 20 receives the signals generated by the transmitter 18 during the motion sequence. At each sampling interval, the motion processing unit 16 determines the position and orientation of the sensor 20 in relation to the transmitter 18, and forwards the data to the computer 12, where it is processed and stored in memory 11, 13.

The student, using the same sensor arrangement, tries to imitate the teacher's motion sequence spatially and temporally. The computer 12 displays a graphic image of the student's trajectory on the monitor 10 alongside the previously stored trajectory of the teacher. Thus, the student receives immediate feedback in real-time during each motion.

Figure 2:
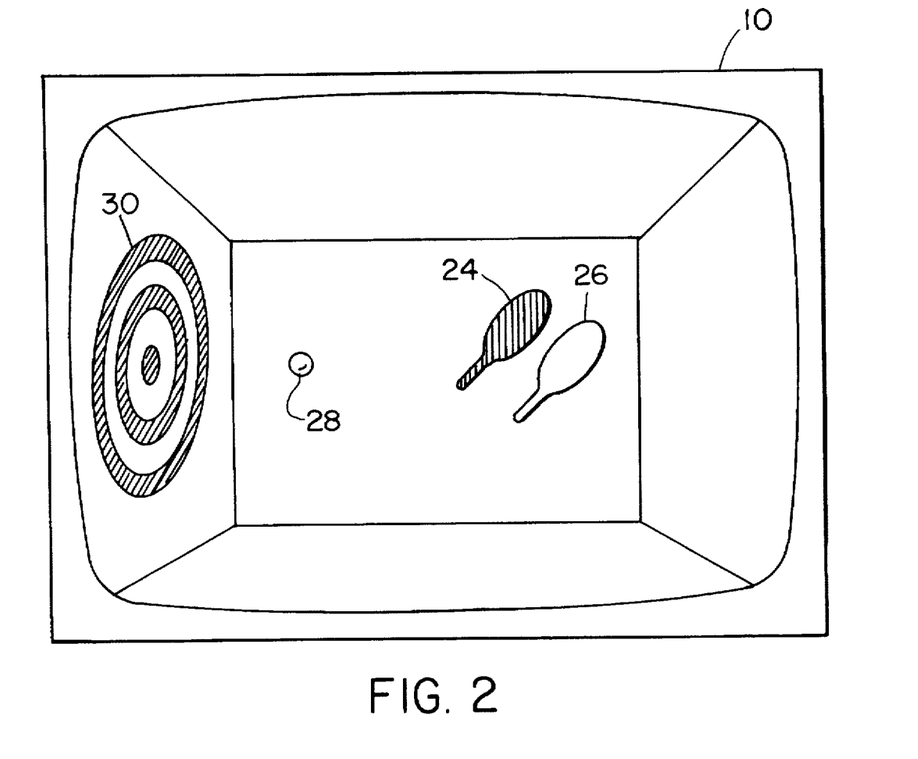
FIG. 2 is a monitor image of graphics for teaching a student the motion of striking a ball with a paddle in accordance with the present invention.

If the student's motion involves contact with a moving or stationary object represented on the monitor 10, the computer 12 provides knowledge of the resulting trajectory of the object. An example is shown in FIG. 2, which provides an illustration of what a student would view on the monitor 10 for learning the motion of striking a ping-pong ball 28 with a paddle 26. In this example, the student learns to strike a computer generated virtual ping-pong ball 28 with a virtual paddle 26, sending the ball 28 to the center of a target 30 with a desired speed. The ball 28 is presented on the monitor 10, projected from an initial position with an initial velocity. When the paddle 26 strikes the ball 28, the resulting trajectory of the ball 28 is derived from simple dynamics equations and is displayed on the monitor 10. The resulting trajectory may include the spin and translational motion imparted on the ball. The teacher's paddle 24 is displayed in the same frame of reference as the student's paddle 26 and thus, the student can imitate the teacher's motions in real-time with the system providing immediate feedback of the student's progress.

The software allows the student to control the speed of the teacher ranging from slow motion up to real-time. By operating in slow motion, a student can pay attention to detail where needed. The software can slow down the resulting trajectory of the stricken ball so the student can see exactly where the ball hits the racquet.

Several teachers can be made available to a student so that a student can learn a motor skill from several points of view.

In many applications, a student learns most efficiently from a teacher whose skill is slightly superior to that of the student rather than from an expert. Initially, a student may select a teacher having basic skills, and increase the teacher's skill level as the student progresses.

The software can intervene when a student repeatedly fails to strike the ball or hit the target. Upon repeated failures, the software may reduce the skill level of the teacher, allowing the student to refocus on the basics, providing immediate feedback to the student who can immediately correct the imperfections causing failure.

Referring again to FIG. 1, in a preferred embodiment, the computer 12 is a PC with graphics capability. The PC should be of a type which interfaces with the Polhemus device or a similar motion sensing device.

The Polhemus sensor is a commercially available six degree of freedom absolute position and orientation sensor having a transmitter 18 with three orthogonally-disposed antennas and a sensor 20 with three orthogonally-disposed coils. The transmitter 18 periodically emits a low frequency electromagnetic wave pulse from each antenna. The pulses emitted from the transmitter 18 induce current in the sensor 20 coils. The relative strength of the current induced in each coil depends on the distance of the sensor 20 coil from the transmitter and the orientation of the sensor 20 relative to the transmitter 18. The motion processing unit 16 calculates the position and orientation of the sensor 20 relative to the transmitter 18 based on the current induced in the sensor 20 coils. Position and orientation data is periodically transferred from the motion processing unit 16 to the computer 12.

Figure 3:
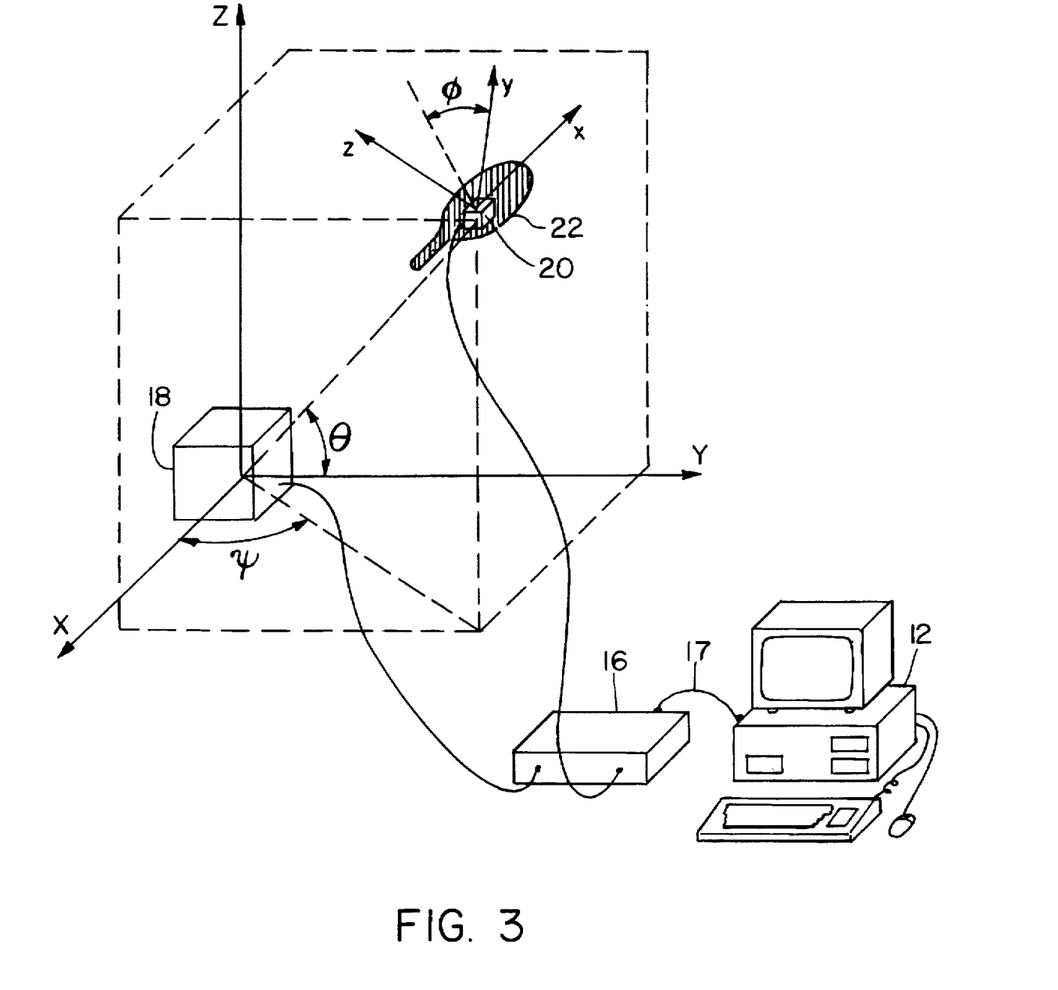
FIG. 3 illustrates the relationship between the reference axes of a Polhemus transmitter and the axes for a Polhemus sensor mounted on a paddle.

As illustrated in FIG. 3, there are two coordinate systems associated with the Polhemus device. The first is the coordinate system of the transmitter 18, which is fixed in space. The second is the coordinate system of the Polhemus sensor 20 which is free to move in three dimensional space. Position and orientation information of the sensor's 20 reference frame relative to the transmitter's 18 reference frame is provided by the Polhemus motion processing unit 16. This information is stored in the form of a 1×6 vector:

$$\begin{bmatrix} X_{sensor} \\ Y_{sensor} \\ Z_{sensor} \\ \psi \\ \theta \\ \Phi \end{bmatrix}$$

Where $X_{sensor}$, $Y_{sensor}$ and $Z_{sensor}$ represent the displacement of the sensor 20 relative to the transmitter 18 along the three principle axes; and $\psi$, $\theta$, and $\Phi$, are the azimuth, elevation, and roll orientations of the sensor 20 relative to the transmitter 18. Azimuth is defined as the rotation of the X and Y coordinates about the Z-axis. Elevation is defined as the rotation of the rotated Z and X coordinates about the rotated Y-axis. Roll is defined as a rotation of the rotated X and Z coordinates about the X-axis.

An experimental system reduced to practice by the inventors includes a commercially available Polhemus IsoTrack II sensor. This sensor has a working range of 1.5 meters with an accuracy of 2.5 mm and 0.75 degrees. The sensor is capable of tracking a single object at a sample rate of 60 Hz, or two objects simultaneously at 30 Hz. An improved version manufactured by Polhemus is capable of tracking a single object at a 120 Hz sample rate or four objects simultaneously at 30 Hz. The improved version is more precise with an expanded range of operation. Other sensor technologies, including optical tracking sensors, are available commercially and are compatible with the present invention.

In the experimental system, data from the Polhemus motion processing unit 16 is transmitted through an RS-232 serial port to the PC 12 at 38.4K baud rate. Software running on the PC 12 uses a buffered interrupt driven communication protocol which insures that no data is lost.

The PC employed in the experimental system is an IBM™ compatible with an Intel™ 486 SX™ processor having two megabytes of random access memory and a super-VGA monitor. The inventors developed the software in C language and assembly language using a C++ compiler.

An optimized graphics library developed in assembly language by the inventors generates a three-dimensional model of the object held by the user during the training session. The experimental system produces approximately 60 frames per second resulting in high quality animation. The images are rendered in 256 colors with 640 by 480 pixel resolution. A standard illumination model is used for realistic three-dimensional rendering.

The experiment conducted by the inventors involved learning the motion of striking a ball with a ping-pong paddle. As shown in FIG. 2, on the monitor 10, the subject sees a ball 28 projected in the direction of the paddle 26. The goal is to strike the ball, sending it into the center of the target 30.

The paddle 26 is displayed on the monitor 10 without the arm or the body of the subject. Since the Polhemus™ device provides orientation information, it takes only a single sensor to fully define the motion of a rigid body, such as a paddle. Additional sensors may be added for providing a model of the arm or a stick figure of the body. The experiment focused on the resulting trajectory of the ball 28, which completely determines the outcome in ping-pong. By only showing the paddle, the subject is forced to concentrate on the most important part of the movement which is to be learned. The subject develops his own strategy for coordinating the rest of his body to achieve that desired endpoint trajectory.

Figure 4:
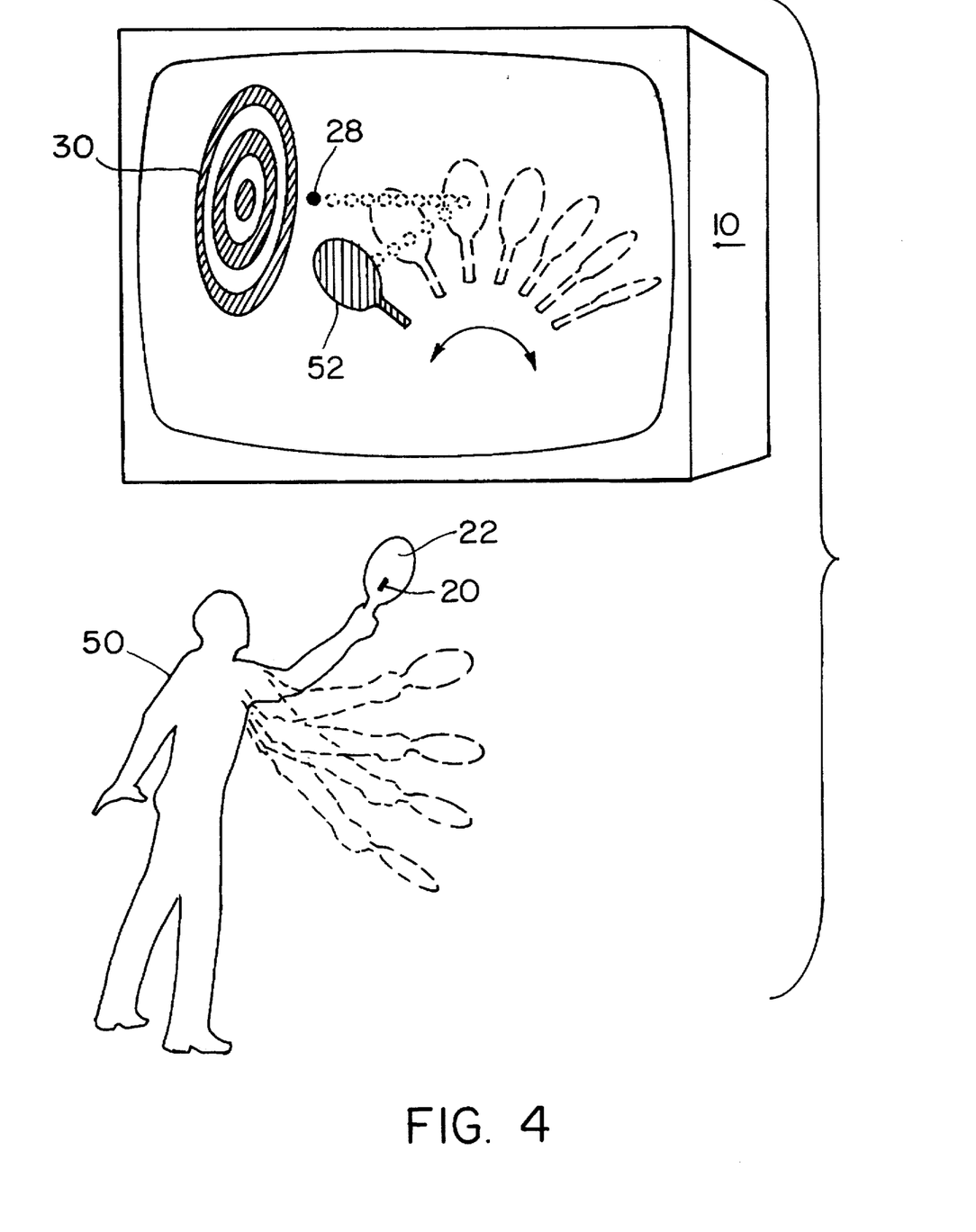
FIG. 4 is a graphic illustration of practice mode in accordance with the present invention.

The experimental system has three modes of operation: practice, training, and feedback. As illustrated in FIG. 4, the experiment starts in practice mode wherein the student can practice movements and become familiar with the experimental environment. In practice mode, as the student 50 moves a real ping-ping paddle 22 having a Polhemus sensor 20 mounted thereon, he views the response of the virtual paddle 52 on the monitor 10. Initially, no ball is generated on the monitor 10 allowing the student 50 to become familiar with moving the paddle. When the student 50 is adequately prepared, he can instruct the computer to generate virtual balls 28 on the monitor 10 for the student to strike with the virtual paddle 52, with the goal being to send the virtual ball 28 to the center of the target 30 provided on the monitor 10. A baseline performance for the student 50 is measured, and patterns of motion for the student 50 are recorded.

Figure 5:
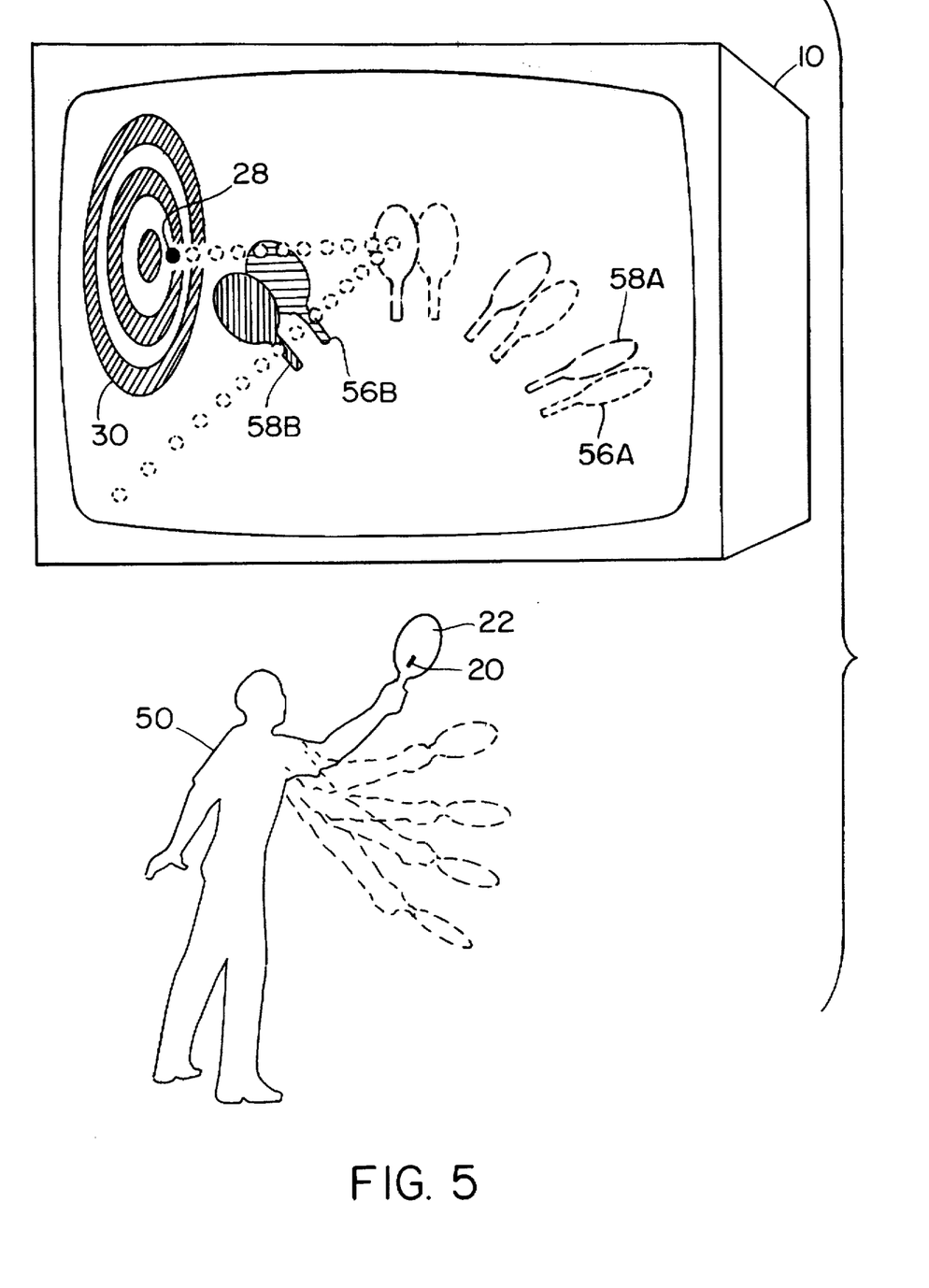
FIG. 5 is a graphic illustration of training mode in accordance with the present invention.

As illustrated in FIG. 5, the next stage of the experiment is training mode wherein a teacher's paddle 58B is provided on the monitor 10 and executes a movement which sends the virtual ball 28 into the target 30. The student's 50 goal in training mode is to follow the motion of the teacher's paddle 58B with the student's virtual paddle 56B. The student is not striking the virtual ball 28 in this mode, but rather is imitating the teacher's movement as the teacher's paddle 58B strikes the virtual ball 28. Initially, the teacher's paddle 58B is shown in slow motion moving from an initial location 58A to a final location 58B so that the student 50 can practice the trajectory of the movement alone. Gradually, the speed of the teacher's paddle 58B is increased to real-time and the student 50, having learned the trajectory, can concentrate on the velocity of the movement. As the student's 50 ability to imitate the teacher improves, the computer automatically increases the speed of the teacher's motion.

The experimental system can detect those portions of the student's trajectory which contained the largest deviation from the teacher's trajectory. On subsequent presentations, those portions are emphasized with graphics in slow motion, focusing the attention of the student 50 to segments of the motion sequence not yet properly learned. This feature replaces the verbal comments of a coach watching a trainee and informing the trainee what he did wrong.

Following the training mode, the student returns to practice mode and the student again performs a practice trial so that his progress may be monitored. A series of virtual balls are again presented to the student. Following a predetermined number of practice trials, the system switches to feedback mode.

Figure 6:
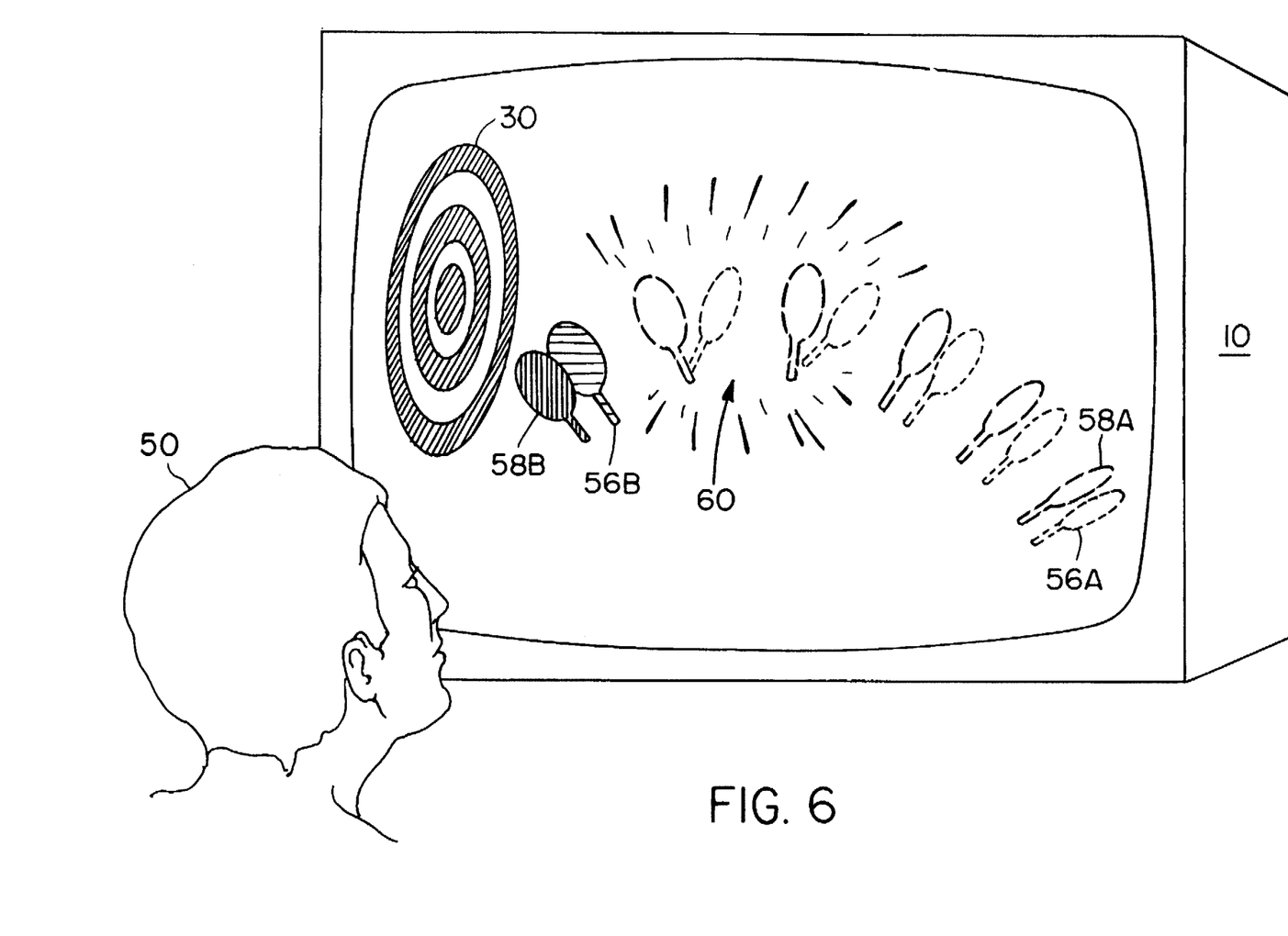
FIG. 6 is a graphic illustration of feedback mode in accordance with the present invention.

As illustrated in FIG. 6, in feedback mode, the student's 50 recorded movements 56A-B are played back superimposed on the teacher's movements 58A-B. The segments of the student's 56B trajectory that deviated from the teacher's 58B trajectory are emphasized 60. The software can display feedback after every practice trial or after a predetermined number of practice trials and that number can be adapted depending on the performance of the student 50. Students 50 will typically reach a performance plateau. After performing well for several trials, a student may thereafter perform poorly for several consecutive trials. Those intervals when the student 50 repeatedly misses the target 30 are an appropriate time to switch to training mode or feedback mode.

An experiment was conducted to assess the effect of training mode on a student's performance. Each student began with forty practice trials during which a baseline performance was recorded. Performance was measured by the average score of the trials, the center of the target being eight points, decreasing one point for each outer ring. Next, the system switched to training mode wherein the student imitated the teacher's motion forty times. The teacher's motion began at a slow speed and gradually increased to real-time. Next, the system returned to practice mode and sent another forty balls while monitoring student performance.

Figure 7:
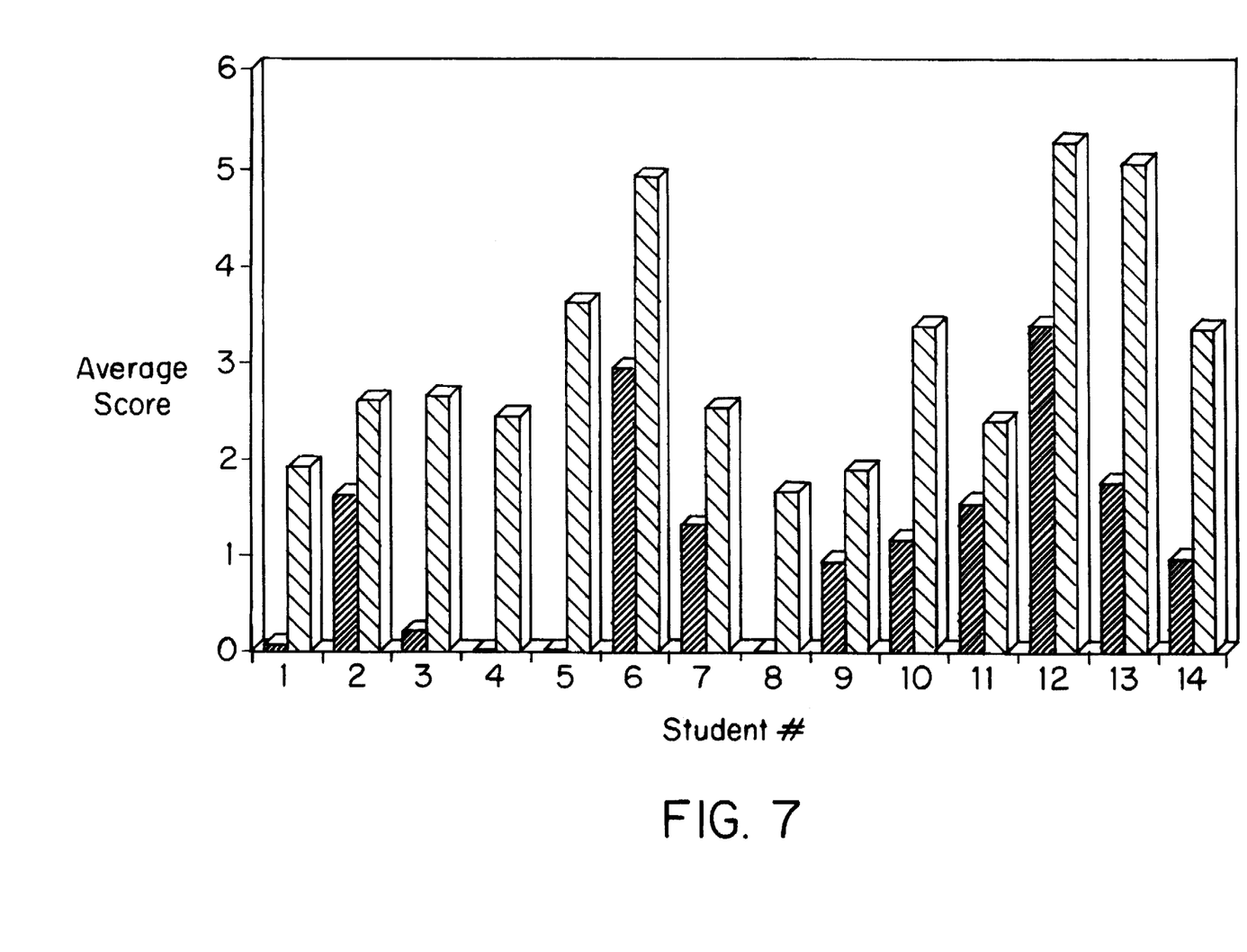
FIG. 7 is a graph representing trial results before training, compared with trial results after training for students showing improvement.

The results for students that demonstrated an improvement in performance after training mode are summarized in FIG. 7. The average score for each trial before (dark shading) and after (light shading) training is represented for each student. These data demonstrate that training mode has an effect both on students who performed badly initially, for example, students 1, 4, and 5; and on students who performed reasonably well initially, for example, students 6, 12, and 13. Both groups demonstrated substantial improvement.

Figure 8:
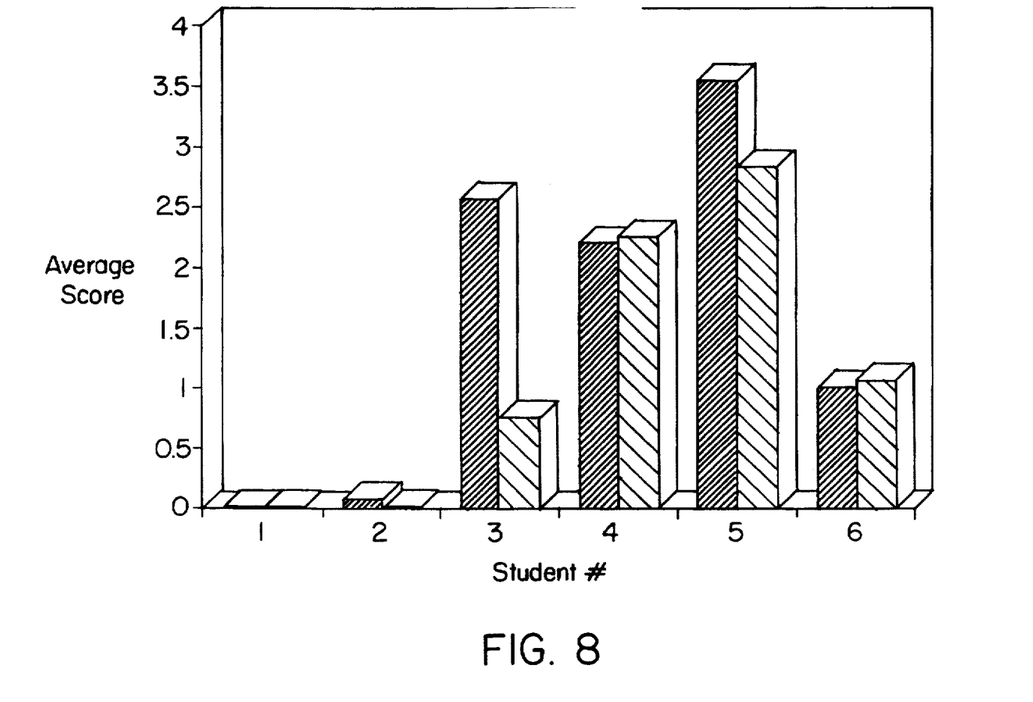
FIG. 8 is a graph representing trial results before training, compared with trial results after training for students who did not improve.

Some students did not improve after training mode as shown in FIG. 8. Students 1 and 2 never hit the target so it is not known what the results would have been if more trials and more training were given. Students 4 and 6 were not affected by training, while the performance of students 3 and 5 decreased. The teacher's trajectory used for students 3, 4, 5 and 6 was that of an expert player. Later, the teacher's trajectory was changed to a lower skill level, or that of an intermediate, and each student thereafter improved with training. The effects of training on a student may be improved by providing a range of teacher skill levels as described above.

Figure 9:
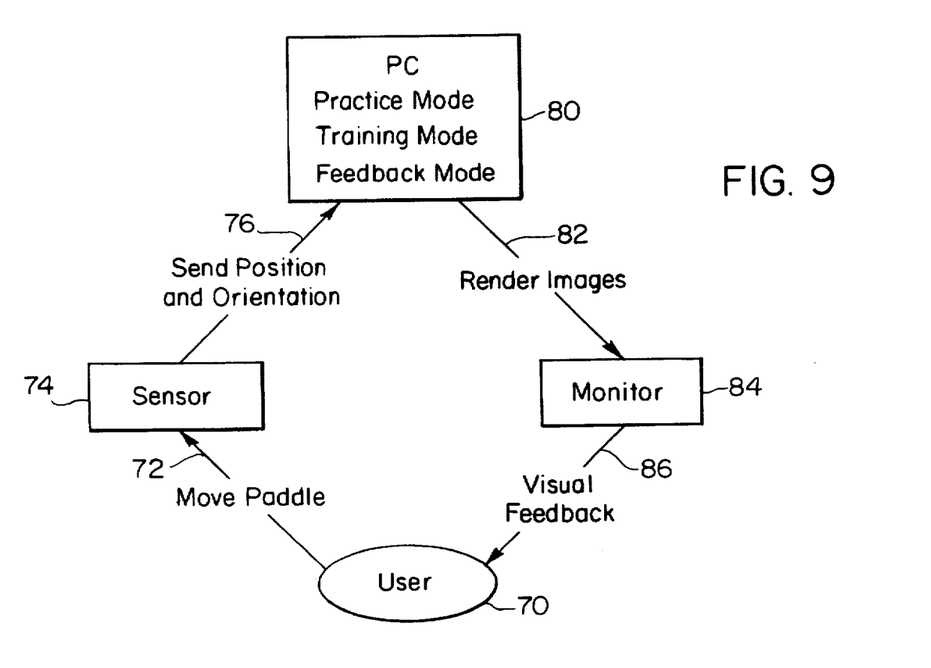
FIG. 9 is a flow chart of the experimental system which demonstrates the closed-loop nature of the system in accordance with the present invention.

FIG. 9 is a flow chart of the experimental system demonstrating the closed-loop nature of the system. As the user 70 moves the object 72, the motion sensor 72 detects the motion and sends position and orientation information 76 about the object to the PC 80. The PC is operating in either practice, training, or feedback mode and depending on the mode of operation, sends an image 82 to a monitor 84. The monitor 84 provides visual feedback 86 to the user 70 so the user can determine which improvements to make in his motions 72.

Figure 10A:
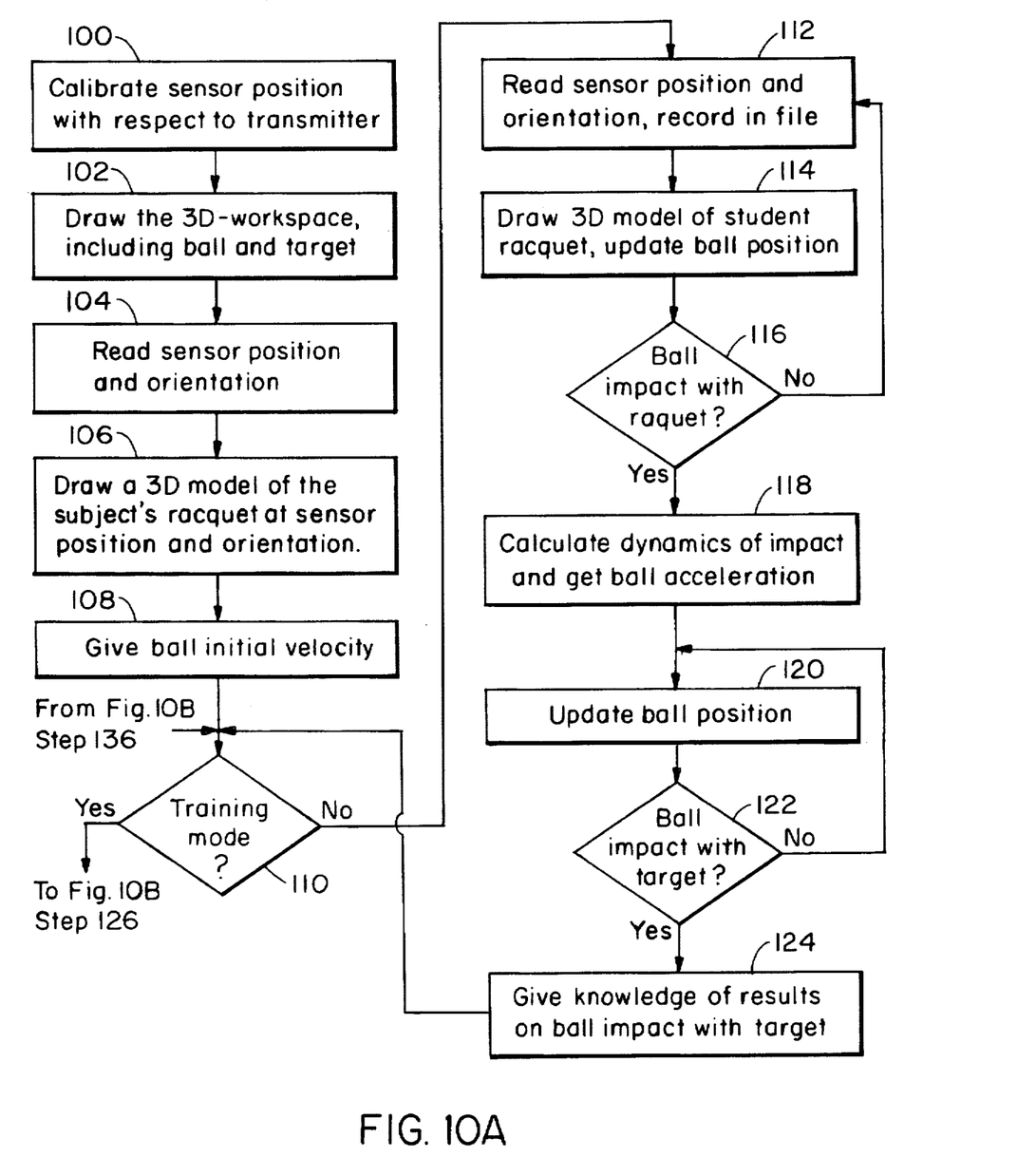
FIGS. 10A and 10B are a flow chart of the experimental system software.
Figure 10B:
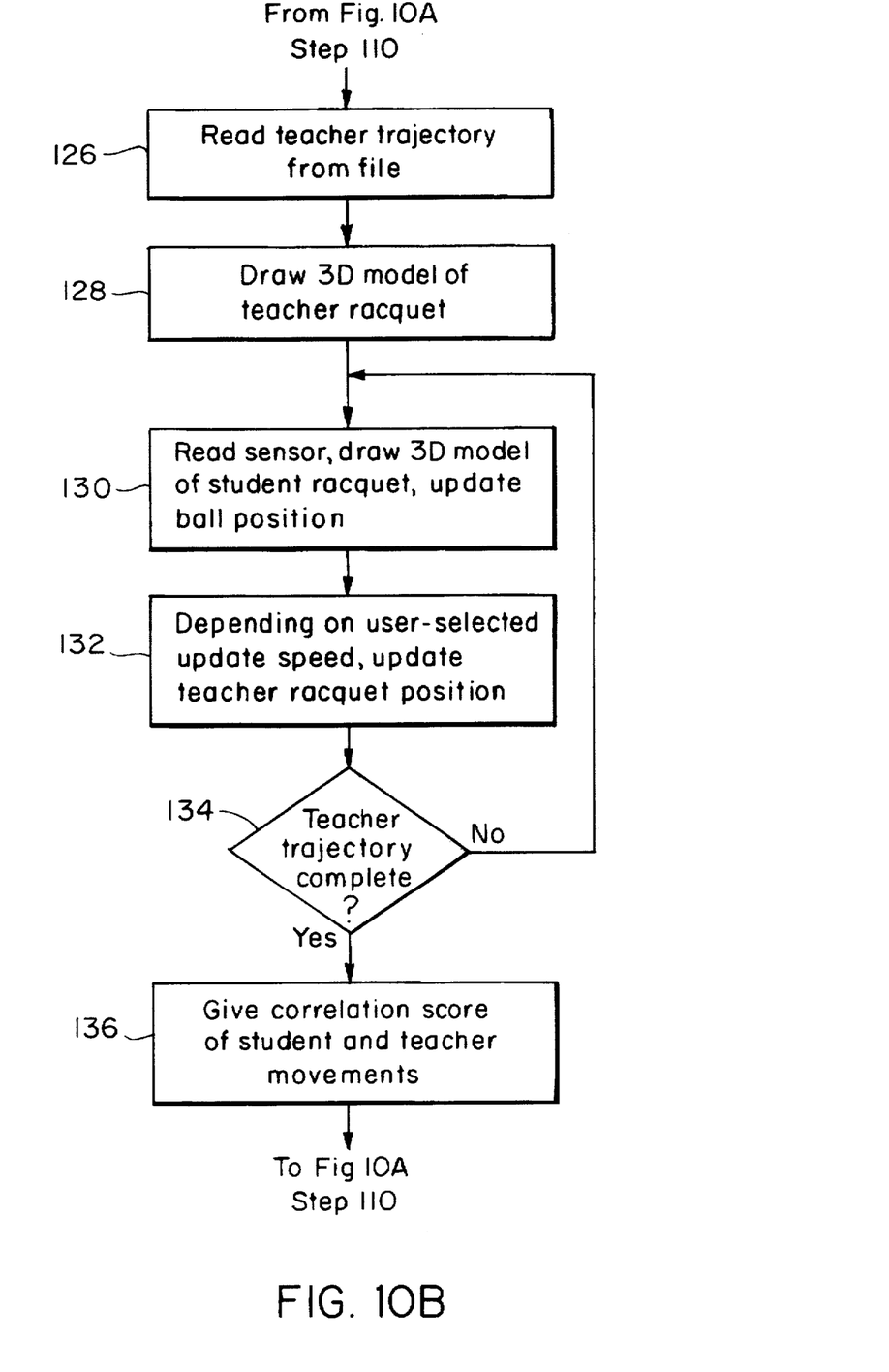

FIGS. 10A and 10B are a flow chart of the experimental system software. The program begins with a calibration of the sensor position with respect to the transmitter 100. The three dimensional work space is drawn including the ball and the target 102. The sensor position and orientation is read 104 and a three dimensional model of the subject's racquet is drawn according to the sensor position and orientation 106. Next, the ball is given an initial velocity 108.

If the student is in practice mode 110, the sensor position and orientation is read and recorded in a file 112. A three dimensional model of the student's racquet is drawn and the ball position is updated 114. If the student's racquet did not hit the ball 116, then the sensor position and orientation is updated and recorded 112 and the model of the student racquet and ball position are updated 114. When the ball comes in contact with the racquet 116, the dynamics of the impact and the ball's acceleration are calculated 118 and updated on the screen 120. If the ball did not yet come in contact with target 122, the position of the ball is again updated 120. Upon the ball's impacting the target 122, a score is calculated and given to the student 124 and the process again repeats 110.

If the student is in training mode 110, a teacher's trajectory is read from the file 126 and a three dimensional model of the teacher's racquet is drawn 128. The student's sensor information is read and a three dimensional model of the student racquet is drawn and the ball position updated 130. Depending on the user selected update speed, the position of the teacher's racquet is updated 132 and until the teacher's trajectory is complete 134, the position of the student's racquet and the teacher's racquet are continually updated. Upon completion of the teacher's trajectory 134, a correlation score of the student's and teacher's movements is calculated and given to the student 136. The process repeats from there 110.

An alternative approach to forming a teacher's motion is to record movements of the student and then program the computer to predict a trajectory that would be successful at sending the ball into the target in a manner which is similar to the student's motion. Using a teacher trajectory derived from the user instead of a prerecorded teacher trajectory, a student can learn from and improve his own style of movement instead of being forced into a motion that may be unnatural for the student.

Another approach to forming a teacher's motion involves self teaching wherein several trial motions of the student are recorded until at least one motion provides the desired results. The computer selects the motion sequence with the best results, and that sequence is used to train the student.

In an alternative embodiment, a sensor may be mounted on a teacher's paddle, as well as on a student's paddle. Both the student's and teacher's movements may be displayed on the monitor in real-time. In this way, a student may learn from a live teacher, in addition to a teacher's movements stored in memory.

While this invention has been particularly shown and described with references to preferred embodiments thereof, it will be understood by those skilled in the art that various changes in form and details may be made therein without departing from the spirit and scope of the invention as defined by the appended claims.

For example, the present invention may be used for learning the motion responding to a moving object, for learning the motion of striking a stationary object, and for learning motions which do not involve objects external to the student's body. Motions which involve striking moving objects include: striking a moving ball with a racquet as in ping-ping, tennis, racquet ball, and squash; striking a moving ball with a blunt object as in baseball and cricket; striking a moving ball with a part of the body as in handball; receiving and catching moving objects as in baseball and football. Motions which involve placing a stationary object in motion include slapping a hockey puck, driving a golf ball, shooting a basketball, and kicking a football. Motions which involve no objects external to the body include walking, skiing, and conducting an orchestra.

The present invention has application in medicine for training motorically impaired patients to relearn motor skills. The motion to be learned may involve something as simple as opening a door, or more complicated actions such as writing with a pen or walking.

The present invention also has application in industry, for example, training a worker to lift heavy objects in a safe manner. Also, a worker may be trained on demanding assembly work.

The present invention is compatible with a wide range of position and orientation sensor technologies, which may include wireless sensor systems.

The present invention is intended not only for learning motions which require only a single sensor as in the ping-pong example described above, but is also intended for more complicated motions which may require a plurality of sensors. For example, if a ping-pong player was concerned about not only the motion of the paddle, but also of the motion of his elbow, shoulder, and torso in moving the ping-pong paddle, then sensors may be added to those locations and his motion analyzed and compared to a teacher whose motion was recorded using a similar array of sensors.

Depending on the motion to be learned, the present invention may produce better results with a large screen television, or a projection television rather than a computer monitor.

What is claimed is:

1. A teaching system for human trajectory learning comprising:

a motion sensing device for sensing a student's movement;

a display;

memory; and electronic means responsive to the motion sensing device to generate, during the student's movement, a student's implement virtual image sequence on the display corresponding to the student's movement of an implement set in motion by the student and to simultaneously generate a teacher's implement virtual image sequence on the display of a corresponding teacher's movement of a corresponding implement set in motion by the teacher from said memory, and to generate a virtual object image on the display to be struck by the teacher's implement virtual image sequences, such that the student may cause the student's implement virtual image sequence to imitate the teacher's implement virtual image sequence for attempting to strike the virtual object image, thereby providing an efficient motion learning sequence for the student.

2. A teaching system as claimed in claim 1, wherein the motion sensing device senses the position and orientation of an implement set in motion by the student.

3. A teaching system as claimed in claim 2, wherein the implement is a racquet.

4. A teaching system as claimed in claim 2, wherein the said virtual object image is a moving projectile struck by the implement.

5. A teaching system as claimed in claim 4, wherein the projectile of the virtual object image has spin, and translational motion.

6. A teaching system as claimed in claim 2, wherein the virtual object image is an object to be impacted by the implement.

7. A teaching system as claimed in claim 2, wherein the student's and teacher's implement virtual image sequences are three-dimensional endpoint trajectory of the implement set in motion without images of the student and teacher.

8. A teaching system as claimed in claim 1, wherein the teacher's movement is a prestored acceptable movement of the student.

9. A teaching system as claimed in claim 1, wherein the electronic means generates the teacher's implement virtual image sequence of the teacher's movement to be displayed at a reduced speed.

10. A teaching system as claimed in claim 9, wherein the electronic means increases the speed of the teacher's implement virtual image sequence of the teacher's movement as the student becomes proficient in following the teacher's movement.

11. A teaching system as claimed in claim 1, wherein the teacher's movement is selected from a library of stored teacher's movement in the memory according to the student's need.

12. A teaching system as claimed in claim 1, wherein the motion sensing device comprises fixed and moving units so as to establish an oriented electromagnetic field between said fixed and moving units of the motion sensing device.

13. A teaching system as claimed in claim 1, wherein the motion sensing device senses the position and orientation of the implement set in motion by the student and wherein the student's implement virtual image sequence is derived from the sensed position and orientation of the implement.

14. A teaching system as claimed in claim 1, wherein the student's and teacher's implement virtual image sequences are displayed in three-dimensional form to provide a perception of depth.

15. A method for teaching human trajectory learning motion, comprising:

sensing a student's movement with a motion sensing device;

generating by the electronic means, during the student's movement of an implement set in motion by the student, a student's implement virtual image sequence in response to the student's movement and a teacher's implement virtual image sequence of a teacher's movement of a corresponding implement set in motion by the teacher from a memory; and displaying said teacher's implement virtual image sequence of a teacher's movement simultaneously with the student's implement virtual image sequence on a display, and virtual object image, generated by the electronic means, on said display to be struck by the teacher's implement virtual image sequences, such that the student may cause the student's implement virtual image sequence to imitate the teacher's implement virtual image sequence for attempting to strike said virtual object image, thereby providing an efficient motion learning sequence for the student.

16. The method of claim 15, wherein the step of sensing a student's movement comprises sensing the position and orientation of the implement set in motion by the student's movement.

17. The method of claim 16, wherein the implement is a racquet.

18. The method of claim 16, wherein said virtual object image is a moving projectile, and said method further comprises the steps of striking said projectile with the implement set in motion by the student and displaying the resulting trajectory of the projectile.

19. The method of claim 18, wherein the step of displaying the trajectory of the projectile takes into account the projectile's spin.

20. The method of claim 16, wherein the virtual object image is an object to be impacted by the implement.

21. The method of claim 16, wherein the step of displaying the student's and teacher's implement virtual image sequences displays three-dimensional endpoint trajectory of the implement set in motion without images of the student and teacher.

22. The method of claim 15, wherein the step of generating a teacher's implement virtual image sequence of the teacher's movement includes prestoring an acceptable movement of the student as the teacher's movement in the memory.

23. The method of claim 15, wherein the step of displaying said teacher's implement virtual image sequence of the teacher's movement includes displaying the teacher's movement at a reduced speed.

24. The method of claim 23, further comprises the steps of increasing the speed of the teacher's implement virtual image sequence of the teacher's movement as the student becomes proficient at following the teacher's movement.

25. The method of claim 15, wherein the step of generating a teacher's implement virtual image sequence of a teacher's movement includes the step of selecting a teacher's movement from a library of stored teacher's movement in the memory according to the student's need.

26. The method of claim 15, wherein the motion sensing device comprises fixed and moving units, and wherein the step of sensing a student's movement with a motion sensing device comprises the step of establishing an oriented electromagnetic field between the fixed and moving units of the motion sensing device.

27. The method of claim 15, wherein the step of sensing comprises sensing the position and orientation of the implement set in motion by the student, and said generating step further comprises the step of deriving the student's implement virtual image sequence from the sensed position and orientation of the implement.

28. The method of in claim 15, wherein the step of displaying the student's and teacher's implement virtual image sequences displays the implement virtual image sequences in three-dimensional form to provide a perception of depth.

29. A teaching system for human trajectory learning comprising:

a motion sensing device for sensing movement of the position and orientation of an implement set in motion by a student;

a display; and electronic means responsive to the motion sensing device to generate, during the student's movement, a student's implement virtual image sequence on the display corresponding to the student's movement and to simultaneously generate a teacher's implement virtual image sequence on the display corresponding to a teacher's movement of a corresponding implement set in motion by the teacher, and to generate a virtual object image on the display to be struck by the teacher's implement virtual image sequences, such that the student may cause the student's implement virtual image sequence to imitate the teacher's implement virtual image sequence for attempting to strike the virtual object image, thereby providing an efficient motion learning sequence for the student.

30. A teaching system for acquiring motion skill comprising:

a motion sensing device for sensing the position and orientation of a means set in motion by a student;

a display;

memory; and electronic means responsive to the motion sensing device to generate, during the student's movement, a student's movement graphical image sequence on the display derived from the sensed position and orientation of the means set in motion by the student, and to simultaneously generate a teacher's movement graphical image sequence data on the display of a corresponding means set in motion by a teacher from the memory, and to generate an object image on the display to be struck by the teacher's virtual image sequences, such that the student may cause the student's movement graphical image sequence to imitate the teacher's movement graphical image sequence for attempting to strike the object image, thereby providing an efficient motion learning sequence for the student.

31. A method for teaching motion skill, comprising:

sensing, with a motion sensing device, the position and orientation of a means set in motion by a student;

generating by the electronic means, during the student's movement, a student's movement graphical image sequence of the means set in motion by the student, the student's movement graphical image sequences being derived from the sensed position and orientation of the means set in motion by the student and a teacher's movement graphical image sequence data of a corresponding means set in motion by a teacher from a memory; and displaying said teacher's movement graphical image sequence simultaneously with the student's movement graphical image sequence on a display means, and an object image, generated by the electronic means, on said display means to be struck by the teacher's movement graphical image sequences, such that the student may cause the student's movement graphical image sequence to imitate the teacher's movement graphical image sequence for attempting to strike the object image, thereby developing the coordinates of the temporal and spatial aspects of motion.

32. A teaching system for human trajectory learning comprising:

a motion sensing device for sensing the position and orientation of an implement set in motion by a student;

a display;

memory; and electronic means responsive to the motion sensing device to generate, during the student's movement, a student's virtual image sequence on the display derived from the sensed position and orientation of the implement set in motion by the student, and to simultaneously generate a teacher's virtual image sequence data on the display of a corresponding implement set in motion by a teacher from the memory, and to generate a virtual object image on the display to be struck by the teacher's virtual image sequences, such that the student may cause the student's virtual image sequence to imitate the teacher's virtual image sequence for attempting to strike the virtual object image; the student's and teacher's virtual image sequences being three-dimensional endpoint trajectory of the implement in motion without images of the student and teacher, the student's and teacher's virtual image sequences being prompted by said virtual object image so that the student attempting to strike the virtual object, thereby developing the coordinates of the temporal and spatial aspects of motion.

33. A method for teaching motion human trajectory learning, comprising:

sensing, with a motion sensing device, the position and orientation of an implement set in motion by a student;

generating by the electronic means, during the student's movement, a student's virtual image sequence of a three-dimensional endpoint trajectory of the implement set in motion by the student, the student's virtual image sequences being derived from the sensed position and orientation of the implement, and a teacher's virtual image sequence data of a three-dimensional endpoint trajectory of a corresponding implement set in motion by a teacher from a memory; and displaying on a display, the teacher's virtual image sequence without images of the student and teacher simultaneously with the student's virtual image sequence and a virtual object image, generated by the electronic means, to be struck by the teacher's virtual image sequences, such that the student may cause the student's virtual image sequence to imitate the teacher's virtual image sequence, and the student and teacher's virtual image sequences being prompted by said virtual object image so that the student attempting to strike the virtual object, thereby developing the coordinates of the temporal and spatial aspects of motion.

* * * * *

UNITED STATES PATENT AND TRADEMARK OFFICE
CERTIFICATE OF CORRECTION

PATENT NO. : 5,554,033
DATED : September 10, 1996
INVENTOR(S) : Emilio Bizzi, Ferdinando A. Mussa-Ivaldi, and Reza Shadmehr It is certified that error appears in the above-indentified patent and that said Letters Patent is hereby corrected as shown below:

Title page item [75], replace "Ferinando A. Mussa-Ivaldi" with ---Ferdinando A. Mussa-Ivaldi---.

Signed and Sealed this

Tenth Day of December, 1996

*Attest:*

BRUCE LEHMAN

*Attesting Officer*   *Commissioner of Patents and Trademarks*